Oct. 15, 1963    R. K. STRASEL    3,106,813
REEL TYPE LAWN MOWER CUTTING ADJUSTMENT
Filed April 17, 1961    2 Sheets-Sheet 1

INVENTOR:
R. K. STRASEL
BY: Arthur J. Hansmann
ATTORNEY

Oct. 15, 1963   R. K. STRASEL   3,106,813
REEL TYPE LAWN MOWER CUTTING ADJUSTMENT
Filed April 17, 1961   2 Sheets-Sheet 2
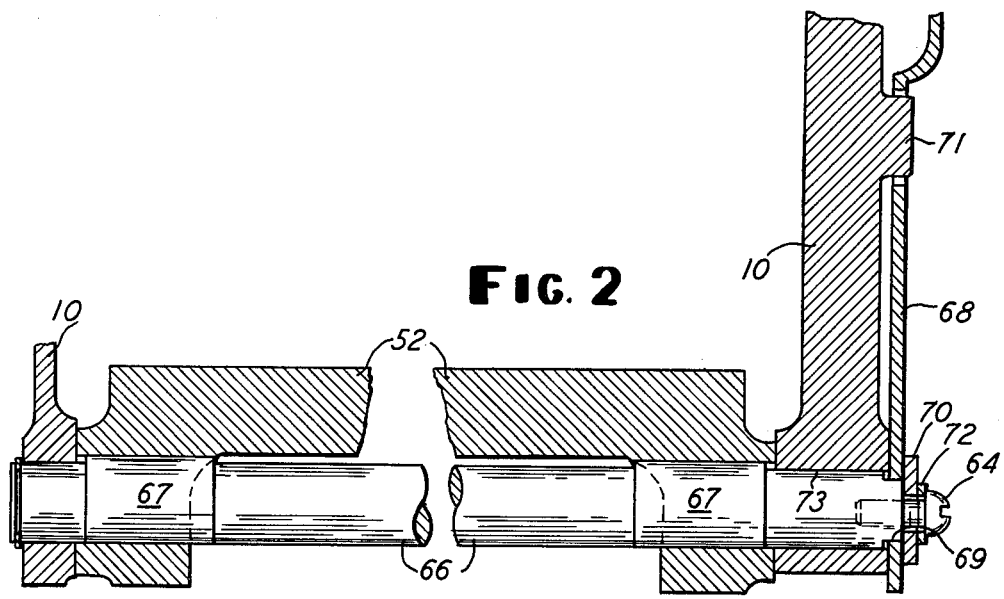
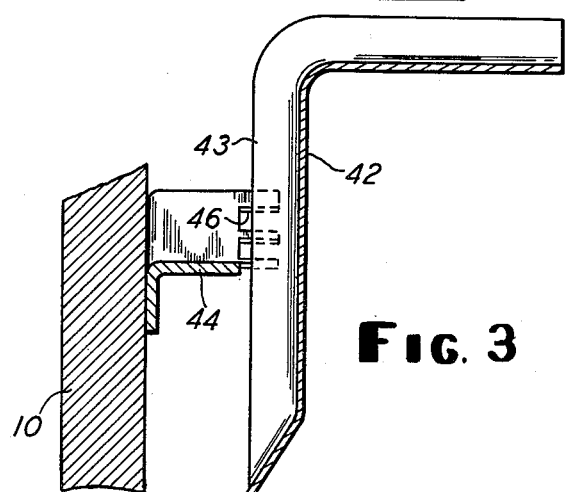
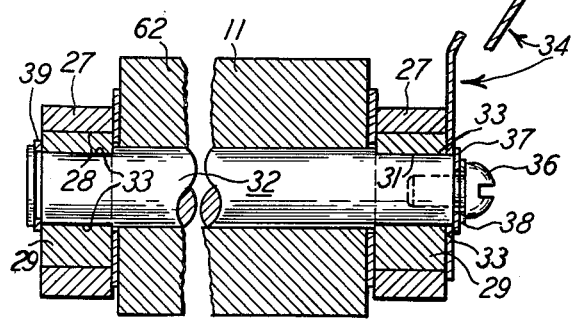
INVENTOR:
R.K. STRASEL
BY: *Arthur J. Hansmann*
ATTORNEY sed Oct. 15, 1963

3,106,813
REEL TYPE LAWN MOWER CUTTING ADJUSTMENT
Raymond K. Strasel, Winthrop Harbor, Ill., assignor to Jacobsen Manufacturing Co., Racine, Wis., a corporation of Wisconsin
Filed Apr. 17, 1961, Ser. No. 103,381
7 Claims. (Cl. 56—249)

This invention relates to a cutting adjustment for a reel type of lawn mower. More specifically, it relates to a fine adjustment for the bed plate of the mower and for the ground-engaging roller of the mower, and in the ground-engaging roller, it is particularly adaptable to a reel type of lawn mower which is employed in mowing the putting green of a golf course and in like applications where the finest and most accurate type of mowing is required.

It is a general object of this invention to provide an accurate and fine adjustment for both the bed plate or knife and the ground-engaging roller of a reel type of lawn mower with these elements being adjustable in a minute degree and beyond the adjustment normally provided for both the bed plate and the roller, and the bed knife adjustment avoids reel and knife lapping.

Another object of this invention is to provide an adjustment for both the bed plate and roller of a lawn mower and wherein the adjustment can be accurately brought to a desired position and retained in that position even against the normal vibration and movement of the lawn mower, which is easily selected and made.

Still another object of this invention is to provide the adjustment mentioned in the foregoing and to do so with only a minimum of addition and alteration to the already existing type and construction of lawn mower, such as the putting green mower for the golf course.

Other objects and advantages will become apparent upon reading the following description in light of the accompanying drawings wherein:

FIG. 2 is a sectional view taken on the line 2—2 of FIG. 1 and showing a fragment thereof.

FIG. 3 is a sectional view taken on the line 3—3 of FIG. 1 and showing a fragment thereof.

The same reference numerals refer to the same parts throughout the several views.

Figure 1:
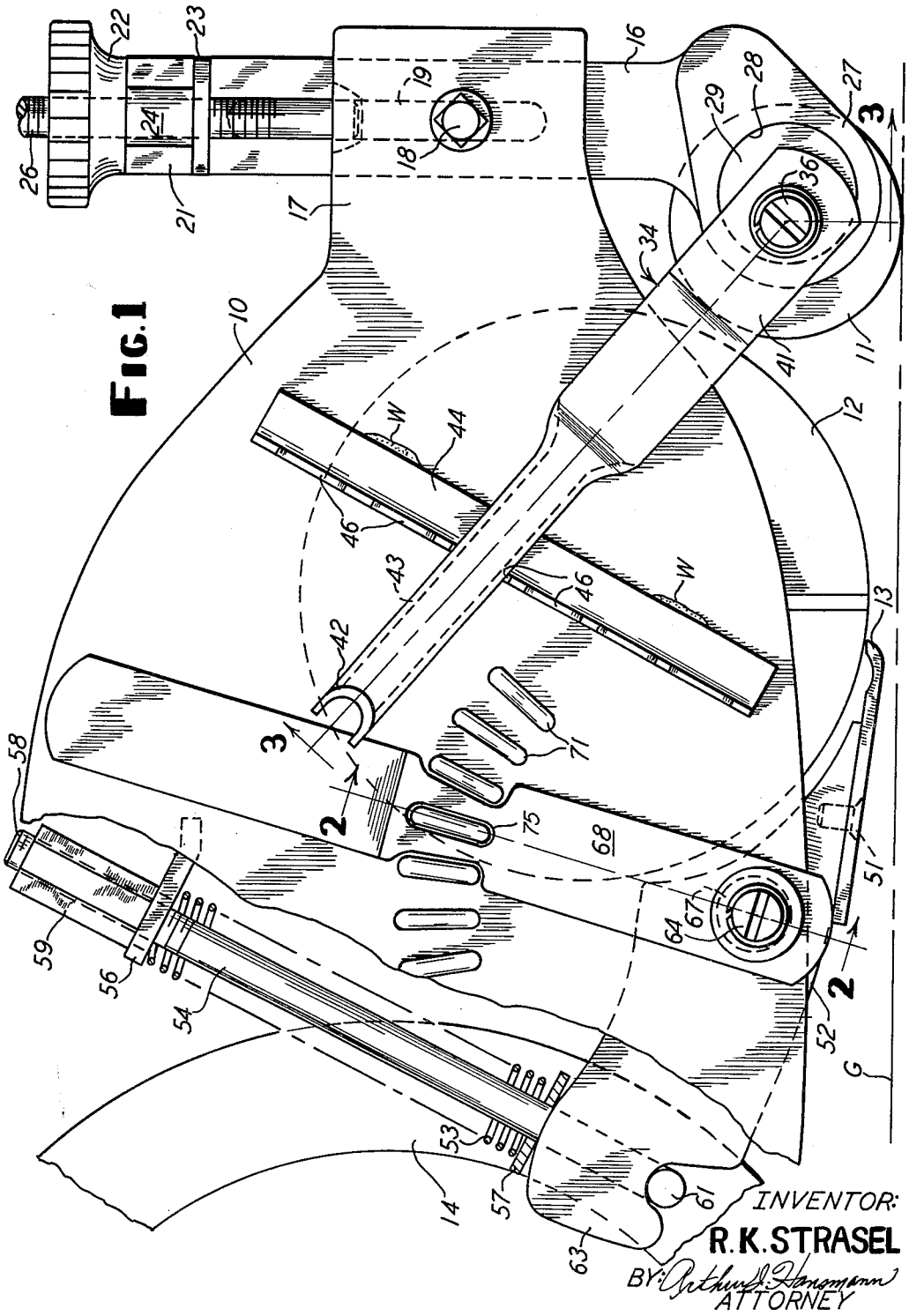
FIG. 1 is a side elevational view of a front fragment of a lawn mower incorporating a preferred embodiment of this invention.

As mentioned, the lawn mower of this particular invention is the reel type and particularly the type which includes a forwardly disposed ground-engaging roller which is included and disposed for permitting the most accurate mowing known today. Patent No. 1,767,510 also shows this type of mower which includes the forwardly disposed ground-engaging roller and the reel and bed plate and then the rearwardly disposed ground-engaging wheel or member such that the mower is supported at a location forward of the reel and also rearward of the wheel.

The drawings therefore disclose side plates or frames 10 which support the forwardly disposed roller 11 and the grass cutting reel 12 and the bed plate 13 and the ground engaging member or wheel 14. A ground line indicated "G" is also shown and it will of course be understood that the roller 11 and the wheel 14 roll on the ground line G when the mower is in the operating position for the reel 12 to cut the grass against the bed knife 13.

With this general description of a substantially conventional lawn mower, the following will therefore describe the parts in detail, including the elements of course of the invention. A standard 16 is vertically slidably mounted in the forward end 17 of the frame or plate 10 and the latter accommodates a bolt 18 which extends therethrough for clamping the standard 16 in its adjusted position in a conventional and well-known manner. Thus the standard 16 has the usual slot 19 extending therefrom for reception of the shank of the bolt 18 so that the latter can secure the standard 16 in the selected elevated position. In order to permit adjustment of the standard 16 with respect to the frame 10, the standard 16 has the usual angular and bifurcated upper end 21 extending between the upper nut portion 22 and the lower nut portion 23 of a spool-like member which includes an intermediate portion 24 extending between and connecting together the parts 22 and 23 such that upon movement of the spool, the flanked upper end 21 of the standard 16 will similarly be moved. To accomplish a controlled movement, a threaded stud 26 extends axially of the spool member and it abuts the frame front end 17 so that, upon rotation of the spool member, the latter is displaced vertically and it of course carries the standard 16 therewith so that the desired adjustment is accomplished. Then, of course, the bolt 18 will be tightened so that the standard 16 will be secured in its set position.

The lower end of the standard 16 includes a boss or hub 27 which has a circular opening or socket 28 extending therethrough. The opening or socket 28 has a cam 29 rotatably disposed therein and the latter in turn has an eccentrically disposed circular opening 31 extending therethrough for rotatably receiving an offset member or shaft 32 which extends across the width of the mower. In turn, the shaft 32 rotatably supports the ground-engaging roller 11, and it will of course be understood that there may be several such rollers 11, and this of course is the usual and well-known construction of supporting the front end of the mower by means of the several rollers 11 and 62 on the shaft 32. FIG. 3 also shows that the standard 16 exists on both sides of the mower in that two bosses 27 are shown in FIG. 3, and this also is of a well-known mower construction and need not be further described in order that a complete description of the invention be made known to one skilled in the art.

Both ends of the shaft 32 are shown to be milled as at 33 to have the two opposite flats 33 which receive a lever or rotation-inducing member 34 such that the member 34 is mounted to be non-rotatable with respect to the shaft 32 so that upon rotation of the member 34, the shaft 32 will rotate in an identical amount. A screw or fastener 36 is shown threaded into this end of the shaft 32 and a washer 37 and a lock washer 38 are also disposed on the shaft 32 and the screw 36 to secure the lever 34 to the shaft 32 as shown. The opposite end of the shaft 32 is shown to be provided with a snap ring 39 which secures that end of the shaft 32 to the boss 27. Milled ends 33 also extend through the cams 29. At this time it will therefore be understood that the cams 29 are of course eccentric with respect to the axis of the shaft 32 such that upon rotation of the shaft 32 by means of the lever 34, the cams 29 will also be rotated in the sockets 28 and this rotation will of course vertically displace the shaft 32 and correspondingly vertically displace the rollers or ground-engaging members 11 and 62. In this manner, the reel 12 is vertically displaced in accordance with the adjustment or displacement of the ground-engaging members 11 and 62, and this therefore effects the desired vertical displacement of the reel 12 in order that the grass can be cut at the specific desired elevation. The lever 34 therefore consists of the lower end 41 which is mounted on the shaft 32 to rotate therewith, and the upper end 42 of the lever 34 is the handle end and it is shown to be formed into two sides designated 43. A rack or indexing member 44 is attached to the frame 10, and is shown to be attached thereto by means of the welding indicated "W," but it will of course be understood that the rack 44 could be made by being cast integral with the member 10. The indexing member 44 includes a plurality of openings or notches 46 which receive the lever handle 42 so that the lever 34 can of course be set in any desired notch 46 and thus the particular rotation of the shaft 32 is likewise set and retained in the set position. It will of course be understood that the lever 34 is of a spring material so that the handle 42 can be withdrawn from the notches 46 and moved to another selected notch 46 and released for re-entry of the selected notch. Also, it will be understood that the standard 16, being vertically adjustable, will require the lever 34 to be displaced vertically and thus the engagement between the lever 34 and the rack 44 must be adapted to accommodate the adjustment of the standard 16 and this is of course provided for in the particular indexing mechanism shown as comprised of the lever 34 and the rack 44 since the lever 34 can slide along its longitudinal axis with respect to the rack 44.

Of course it will now also be understood that the indexing mechanism which consists of the members 34 and 44, and the cams 29, comprise a structure which permits vertical adjustment of the reel 12 about of course the ground point of contact of the rear wheel 14, and in a minute or accurate amount which is not accurately achieved by the heretofore-described adjustment of the standard 16 and the fine adjustment is of course highly desirable and even required in the most accurate type of mowing, such as the golf course putting green.

Referring next to the adjustment for the bed knife 13, it will be noted that the knife 13 is supported by means of the usual screw 51 in the shoe or support member 52 which is conventionally provided in the reel type of lawn mower. The support member 52 is mounted in the mower by a spring type of mounting which consists of the compression spring 53 and its control rod 54 and the spring extends around the rod and between a stationary support plate 56 and a lower plate 57. The plate 56 is of course attached in a fixed position to the frame 10 and the rod 54 extends thereabove in a threaded portion 58 which engages a nut 59. Thus, since the lower end 61 of the rod 54 engages the rear end of the member 52, rotation of the nut 59 extends or withdraws the rod 54 and accordingly this displaces the rear end 63 of the member 52 as the latter is pivoted about a cam support hereinafter described and secured by the bolt 64.

FIG. 2 thus shows the bolt 64 threaded into a shaft or circular member 66 which extends across the mower and supports the member 52 thereacross. The shaft 66 includes two cam portions 67 which are an affixed part of the shaft 66 and they therefore rotate with any rotation of the shaft, and such rotation is induced by the lever or rotating means 68 which engages the milled portion 69 of the shaft 66 so that the lever 68 and the shaft 66 are connected to rotate together. Again, a washer 70 and a lock washer 72 extend adjacent the lever 68 to secure the latter to the shaft 66 along with the bolt 64.

The frame 10 has indexing pieces or projections 71 attached thereon, and the lever 68 has an opening 75 for receiving the selected one of the projections 71 as the lever 68 is rotated into alignment with the selected projection 71. Again, of course, the lever 68 is of a spring material so that it can be withdrawn from the projection 71 and rotated therepast to another selected projection 71 and then engaged with the latter projection. It will thus now be understood that upon rotation of the shaft 66 by means of the lever 68, the cams 67 will similarly be rotated and thus they will vertically displace the support member 52 to likewise displace the bed knife 13 with respect to the reel 12 to bring the knife either closer or further away from the reel 12 as desired and thus a minute and accurate adjustment is provided.

Thus, in both adjustments, there is a circular socket, namely 28 on boss 27, and the opening 73 in frame 10, for receiving the cams or circular members 29 and 66. Further, there are offset members 32 and 67, on the members 29 and 66, respectively, such that rotation of the member 29 or 66 effects the desired adjustment or cam action. Further, each has indexing or rotation means, in elements 34, 44 and 68, 71, for inducing the accurate rotation of the members 29 and 66. Also, in both instances, a major or initial adjustment is effected through the threaded nuts 22 and 59 which are connected to the respective members 16 and 52 which in turn have the circular members 29 and 66 respectively thereon. Therefore, the rollers 11 and the bed plate 13 are adjustable members. The levers 34 and 68 are of spring material for their functions.

Thus, the adjustments can be speedily and easily made to an accurate degree, and the precise adjustment is readily visible. A wide arc of handle or lever movement effects the minute adjustment desired for maximum accuracy. Also, only one lever is required for each adjustment which can thus be made on only one side of the mower.

The important feature of the invention resides in the bed knife adjustment since fine lawn mowing depends upon minute positioning of bed knife to reel. With the present adjustment, the most accurate settings are easily achieved, and the usual number of lappings of cutting edges are reduced since the fine adjustment can be made.

What is claimed is:

1. A cutting adjustment for a lawn mower of the type including a cutting reel and a bed knife and a rotatably mounted ground-engaging member with the latter two being adjustable members, comprising a member included in said mower and having a circular socket therein, a cam member rotatably mounted in said socket and including a cam with the eccentricity extending transverse to the axis of said socket for offset movement with respect to said axis upon rotation of said cam member, means attached to said cam member for rotating the latter, one of said adjustable members being mounted on said cam in a manner adaptable to be initially adjusted with respect to the remainder of said mower upon movement of said cam, said cam member being connected to said one of said adjustable members for additional adjustable movement of said one of said adjustable members upon rotation of said cam member.

2. A cutting adjustment for a lawn mower of the type including a cutting reel and a bed knife and a rotatably mounted ground-engaging member with the latter two being adjustable members, comprising a member included in said mower and having a circular socket therein, a circular member rotatably mounted in said socket, an offset member attached to said circular member and constituting a cam with the eccentricity extending transverse to the axis of said socket for offset movement with respect to said axis upon rotation of said circular member, means attached to said circular member for rotating the latter, an adjustable member mounted on said circular member in a manner adaptable to be initially adjusted with respect to the remainder of said mower upon movement of said circular member and being mounted on said offset member in a manner to be additionally adjusted in response to rotation of said circular member.

3. A cutting adjustment for a lawn mower of the type including a cutting reel and a bed knife and a rotatably mounted ground-engaging member with the latter two being adjustable members, comprising a member included in said mower and having a circular socket therein, a circular member rotatably mounted in said socket, an offset member attached to said circular member and constituting a cam with the eccentricity extending transverse to the axis of said socket for offset movement with respect to said axis upon rotation of said circular member, indexing means attached to said circular member for rotating the latter, a threaded member mounted on said mower and being adjustable thereon, an adjustable member connected to said threaded member in a manner adaptable to be initially adjusted with respect to the remainder of said mower upon movement of said threaded member and being mounted on said offset member to be additionally adjusted in response to rotation of said circular member.

4. A cutting adjustment for a lawn mower of the type including a cutting reel and a bed knife, comprising a member included in said mower, a shaft rotatably mounted on said member and extending across the width of said mower, a cam attached to an intermediate portion of said shaft and being rotatable therewith and having the eccentricity of said cam extending transverse to the axis of said reel for offset movement with respect to said axis upon rotation of said shaft, indexing means attached to said shaft for rotating the latter and securing the same in a selected rotated position, a bed knife rotatably supported by said cam and extending toward said cutting reel in one edge of said bed knife and being initially adjustably movable with respect to and toward and away from said reel upon rotation of said shaft and corresponding displacement of said cam, and a support movably mounted on said mower and being connected to said bed knife to rotate the latter on said cam to displace said one edge with respect to said cutting reel upon movement of said support for additional adjustable movement of said bed knife.

5. A cutting adjustment for a lawn mower of the type including a cutting reel and a bed knife and a front-mounted roller, comprising a member included in said mower, a first shaft rotatably mounted on said member and extending across the width of said mower, a cam attached to an intermediate portion of said first shaft and being rotatable therewith and having the eccentricity of said cam extending transverse to the axis of said reel for offset movement with respect to said axis upon rotation of said first shaft, means attached to said first shaft for rotating the latter, a bed knife rotatably mounted on said cam and extending toward said cutting reel in one edge of said bed knife and movable with respect to and toward and away from said reel upon rotation of said first shaft and corresponding displacement of said cam for adjustment of said bed knife, an adjustable support included in said mower and being connected to said bed knife and being movable to rotate said bed knife on said cam for additional adjustment of said bed knife, a standard disposed on said member and being adjustable thereon in an upright direction, a rotatable member rotatably disposed on said standard, a second shaft connected to said rotatable member and being rotatable therewith and being eccentric with respect to said rotatable member in the direction transverse to said axis of said reel, means for rotating said rotatable member and said second shaft to eccentrically displace the latter in said upright direction for additional adjustment of said rotatable member, and said front-mounted roller being rotatably mounted on the eccentricity of said second shaft and eccentrically displaceable along with said shaft.

6. A cutting adjustment for a lawn mower of the type including a cutting reel and a bed knife, comprising a member included in said mower and having a circular socket therein, a shaft rotatably mounted in said socket and extending across the width of said mower, a cam attached to an intermediate portion of said shaft and being rotatable therewith and having the eccentricity of said cam extending transverse to the axis of said socket for offset movement with respect to said axis upon rotation of said shaft, means attached to said shaft for rotating the latter, a bed knife rotatably supported by said cam and extending toward and being movable with respect to said cutting reel in one edge of said bed knife for spacing movement with respect to and toward and away from said reel upon rotation of said shaft and corresponding displacement of said cam for adjustment of said bed knife, and adjustable means connected between said bed knife and the remainder of said mower for moving said bed knife for displacing and additionally adjusting said bed knife and securing said bed knife in a selected position with respect to said reel.

7. A cutting adjustment for a lawn mower of the type including a cutting reel and a bed knife, comprising a member included in said mower and having a circular socket therein, a shaft rotatably mounted in said socket and extending across the width of said mower, a cam attached to an intermediate portion of said shaft and being rotatable therewith and having the eccentricity of said cam extending transverse to the axis of said socket for offset movement with respect to said axis upon rotation of said shaft, a lever attached to said shaft for rotating the latter, an indexing means mounted on said member, said lever and said indexing means having interengageable portions thereon for establishing and securing a selected rotated position of said lever, a bed knife rotatably supported by said cam and extending toward said cutting reel in one edge of said bed knife and being initially adjustably movable with respect to and toward and away from said reel upon rotation of said shaft and corresponding displacement of said cam, and threaded means mounted on said member and connected to said bed knife for rotating the latter on said cam for additional adjustable movement of said bed knife.

References Cited in the file of this patent

UNITED STATES PATENTS

| | | |
|---|---|---|
| 1,001,917 | Banowetz | Aug. 29, 1911 |
| 1,955,174 | Clapper | Apr. 17, 1934 |
| 1,969,211 | Dohm | Aug. 7, 1934 |
| 2,266,307 | Clemson | Dec. 16, 1941 |
| 2,340,849 | Wildeboor et al. | Feb. 8, 1944 |
| 2,388,165 | Loewe | Oct. 30, 1945 |
| 2,891,371 | Duncan | June 23, 1959 |